May 18, 1965     S. C. SPIVEY     3,183,964
AIR-CONDITIONING CONTROL SYSTEM FOR VEHICLES AND THE LIKE
Filed Nov. 16, 1962     2 Sheets-Sheet 1

INVENTOR.
Samuel C. Spivey
BY
Jennings, Carter & Thompson
Attorneys

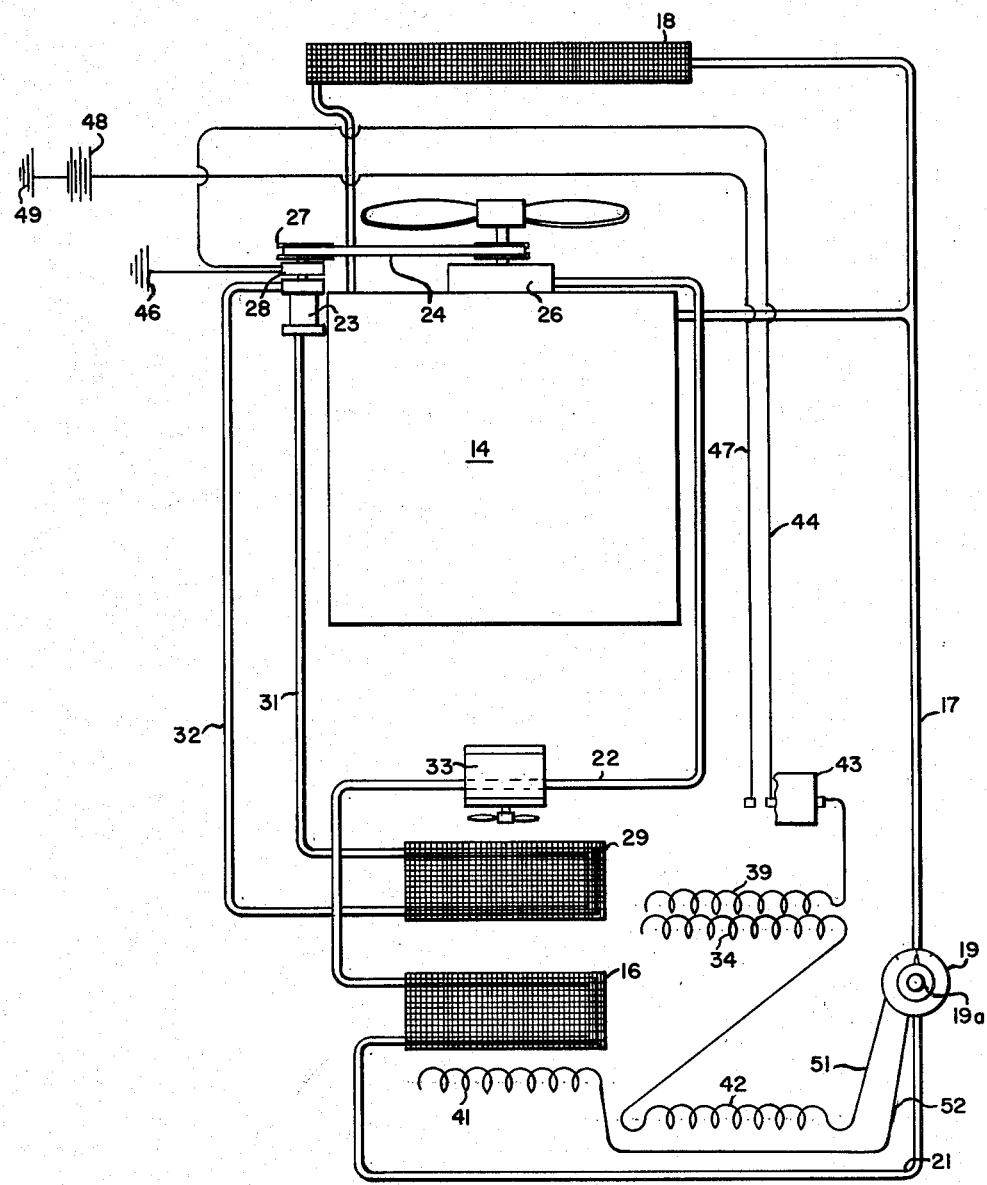

United States Patent Office 3,183,964
Patented May 18, 1965

3,183,964
AIR-CONDITIONING CONTROL SYSTEM FOR
VEHICLES AND THE LIKE
Samuel C. Spivey, 1102 S. 20th St., Birmingham, Ala.
Filed Nov. 16, 1962, Ser. No. 238,168
1 Claim. (Cl. 165—28)

This invention relates to means to control the rate of recovery of the heating or air conditioning systems in vehicles, particularly in passenger automobiles.

It has heretofore been attempted to provide heating and cooling control systems for automobiles in which lower and higher outside temperatures are automatically compensated for. However, in all such systems with which I am familiar, the effects of radiation on the inside temperature has not been taken into account. Thus, in prior systems the effect of outside ambient temperature only has been used to bring about a change in temperature inside the automobile passenger compartment. Under certain weather conditions, both summer and winter, the effect of radiated energy or the lack or decrease of it on the living space in an automobile causes wide variations in the need for heating or cooling in the passenger compartment as does the ambient outside temperature.

It is a prime object of my invention to provide, in association with ambient temperature sensing controls inside the passenger compartment, a control responsive both to ambient and radiant temperatures outside the passenger compartment, and to utilize these temperature responsive controls as a group to regulate the temperature inside the passenger compartment.

Another object is to so mount the outside temperature responsive unit that it will be as free as possible from sensing heat due to conduction from the automobile body.

Another object is to provide an auxiliary temperature responsive control which automatically activates the system for cooling the passenger compartment, only when needed, thus making the entire air heating and cooling system entirely automatic.

A further and more general object is to provide control systems which may be associated with existing heating and cooling apparatus already installed in automobiles and which will lend itself equally to factory installation during the manufacture of new automobiles.

Apparatus illustrating features of my invention is shown in the accompanying drawings forming a part of this application in which.

Figure 1:
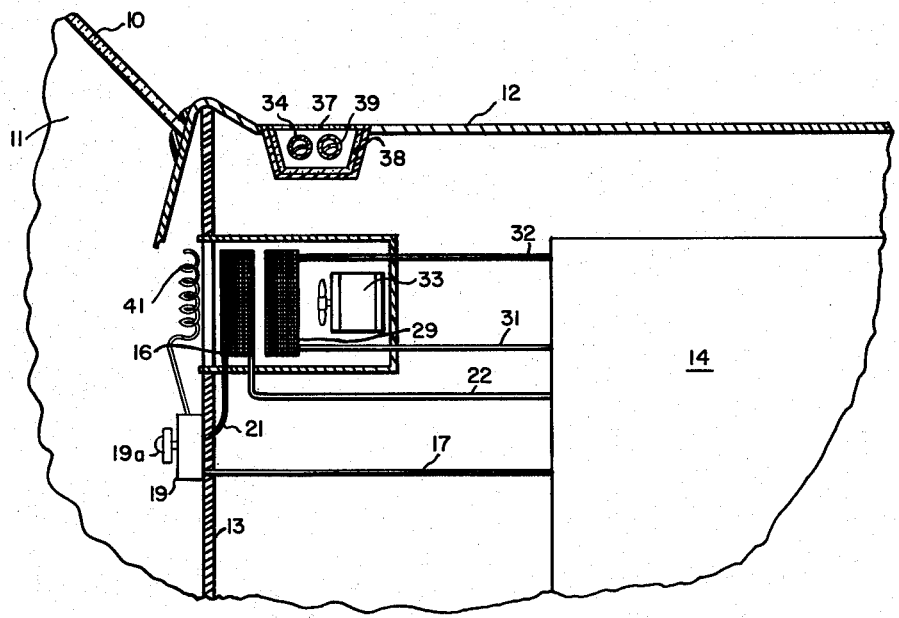
FIG. 1 is a somewhat diagrammatic, vertical sectional view through the fire wall section and hood of an automobile.
Figure 2:
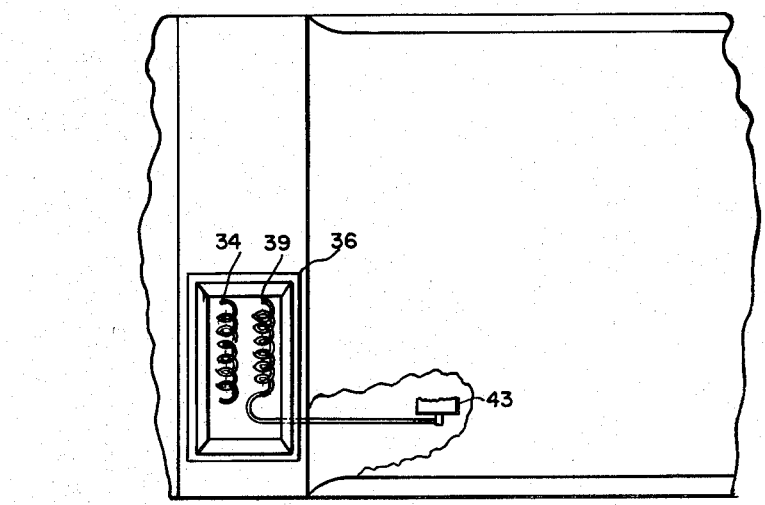
FIG. 2 is a fragmental plan view looking down on the hood of the automobile, just forward of the windshield; and, FIG. 3 is a diagrammatic view illustrating my improved system.

Referring now to the drawings for a better understanding of my invention, I show in FIG. 1 a fragment of an automobile body. Thus, I indicate the windshield at 10, a portion of the passenger compartment at 11, the hood at 12 and the fire wall at 13. The engine is shown diagrammatically in block form at 14.

As will be understood, a heat exchanger 16 is supplied with hot water through a line 17 from the engine 14, there being also the usual radiator 18. The line 17 connects to a manually adjustable modulating valve 19 of the usual type having an adjusting knob 19a thereon in reach of the operator inside the vehicle. A line 21 connects to the heat exchanger 16 and the return line 22 leads back to the cooling system of the automobile.

In the manner understood, there is mounted alongside the engine a compressor 23 driven by a belt 24 from the engine 14. The belt 24 passes over a pulley 27 for driving the compressor. Interposed between the compressor and the drive 27 is an electromagnetic clutch 28.

At 29 I show a heat exchanger, which may be located immediately forwardly of the heat exchanger 16 and to which compressed cooling gas is supplied through a line 31, the same returning through a line 32 back to the compressor 23. As is customary, a small blower 33 is located behind both of the heat exchangers 16 and 29, thus to blow air through both of them in series into the passenger compartment.

In accordance with my invention I mount on the outside of the automobile, preferably in a well provided in the stationary body part just forward of the windshield, a heat sensitive unit indicated by the numeral 34. As shown in FIG. 1, the well may be in the form of a metal box 36 covered by a sheet of glass or the like 37 and sealed in the opening in water-tight manner. Further, I line the entire inside of the compartment or well 36 with insulating material 38, thus to cut down the effect of conducted heat on the temperature responsive means 34. Also in the well 36 I mount a second temperature responsive unit 39. As will be understood, the temperature responsive means 34 and 39 may be in the form of expansion coils or bulbs containing a liquid which when heated exerts greater pressure than when cooler.

Inside the passenger compartment I mount another expansion coil 41 which preferably is located directly in the path of the air passing over the heat exchangers 16 and 29. At a point removed from direct contact with the air passing over the heat exchangers I mount still another temperature responsive expansion coil 42.

As best shown in FIG. 3, the expansion coil 39 has its end connected to a pressure responsive switch 43. One terminal of the switch 43 is connected by a circuit 44 to one side of the electromagnetic clutch 28. The other electrical connection of the clutch is grounded as indicated by the lead 46. The second lead 47 connects the other contact of switch 43 to a battery 48, the other side of which is grounded at 49. It will thus be seen that whenever the temperature of the coil 39 reaches a predetermined value, switch 43 closes, energizing the electromagnetic clutch 28, connecting the compressor 23 in driving relation to the engine of the automobile.

The expansion coil 34 is connected directly in pressure transmitting relation in series with the coil 42, the coil 42 in turn being connected through an extension tube section 51 leading to the modulating valve 19. The expansion coil 41 is also connected by an extension tube section 52 to the modulating valve 19.

From what has been described so far it will be seen that the temperature responsive coil 34 is in position to sense both ambient and radiant temperatures, outside of the passenger compartment. Furthermore, since it is in series with the coil 42 which actually senses the living space ambient temperature, the valve 19 operates in accordance with predetermined conjoint effect of these two coils. Coil 41 also is effective to determine in part the setting of valve 19 and therefore the valve 19 in fact operates in accordance with the combined responses of the three heat responsive expansion coils 34, 41 and 42. Coil 41, being directly in the path of air from the heat exchange units, responds quickly to drastic changes in temperature of the air being discharged. Its action therefore levels out the rate of recovery of the compartment temperature.

If it be assumed that the outside temperature is say 95° F., with the sun shining, and no cloudyness present, it will be apparent that there will be a need inside the passenger compartment for cooling. Under these circumstances, the coil 39, even before the automobile engine is started, has closed switch 43, connecting the compressor in driving relation to the engine. Furthermore, the coils 34, 41 and 42 all will have actuated valve 19 to a position to exclude from heat exchanger 16 any flow of heating fluid from the engine. As the temperature lowers in the passenger compartment it will be apparent that the ambient temperature effect on coil 42 will cause the valve 19 to modulate to a position to maintain the inside temperature precisely as set by the control 19a of the valve 19. Thus, instead of being dependent solely upon the ambient temperature inside the passenger compartment for the setting of valve 19, I have introduced the control 34 which modifies this effect in accordance with radiated energy from the sun as well as the effect of the outside ambient temperature. By shielding the control 34 against conducted heat, I enhance its accuracy with respect to ambient and radiant temperature sensing. It will furthermore be apparent that any decrease in the combined effects of radiant energy and outside ambient temperature on the coil or tube 34 is automatically reflected in the setting of the valve 19, thus to maintain the temperature within the passenger compartment at the desired or predetermined setting, all automatically.

From the foregoing it will be apparent that I have devised an improved control system for the heating and cooling systems of vehicles and the like. In an automobile equipped with my improved system the rate of recovery of the system is extremely fast and the temperature is maintained closely within the predetermined range. By providing the auxiliary tube or control means 39 and switch 43, the cooling system operates only when needed, without any necessity for the operator manually to actuate a switch or otherwise to engage the same.

While I have shown and described my invention as being useful in systems having heating and cooling means, it will be apparent that it has utility in heating systems alone.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

The combination with a vehicle having a passenger compartment and heating and cooling means for the compartment embodying means to deliver air over heat exchangers forming parts of the heating and cooling means and into the passenger compartment of the vehicle, of (a) a first temperature responsive control located outside the passenger compartment in position to receive radiant energy from outside the compartment, (b) an enclosure for said first control insulating it against conducted heat from the vehicle body, (c) a second temperature responsive control positioned to sense directly the temperature of air delivered from the heat exchangers into the passenger compartment, (d) a third temperature responsive control located at a position in the passenger compartment remote from the air passing over the heat exchangers, (e) a temperature responsive valve controlling flow of heating medium to the heat exchanger of the heating means, (f) means operatively connecting the first and third controls to the temperature responsive valve, whereby the setting of the valve is determined in part by the combined effects of outside and inside temperature on said first and third controls, (g) means operatively connecting the second control to the valve, whereby the setting of the valve is further determined in part by the temperature sensed by said second control, (h) a fourth temperature responsive control located outside the vehicle passenger compartment, and (i) means operatively connecting the fourth control to the cooling means whereby the cooling means is automatically energized when the outside temperature reaches a predetermined point.

References Cited by the Examiner
UNITED STATES PATENTS

| 2,490,919 | 12/49 | Raney | 237—8 |
|---|---|---|---|
| 2,686,043 | 8/54 | Smith et al. | 165—22 |
| 2,735,657 | 2/56 | Owen | 165—30 |
| 2,813,680 | 11/57 | Woods | 236—37 |
| 2,836,364 | 5/58 | Ashley | 236—1 |
| 2,884,768 | 5/59 | Gould | 165—43 X |

CHARLES SUKALO, *Primary Examiner.*
JAMES W. WESTHAVER, *Examiner.*